(12) United States Patent
Kanbayashi et al.

(10) Patent No.: US 11,597,238 B2
(45) Date of Patent: Mar. 7, 2023

(54) TIRE SYSTEM

(71) Applicant: DENSO CORPORATION, Kariya (JP)

(72) Inventors: Ryosuke Kanbayashi, Kariya (JP);
Nobuya Watabe, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 3 days.

(21) Appl. No.: 17/157,687

(22) Filed: Jan. 25, 2021

(65) Prior Publication Data

US 2021/0146731 A1 May 20, 2021

Related U.S. Application Data

(63) Continuation of application No. PCT/JP2019/035355, filed on Sep. 9, 2019.

(30) Foreign Application Priority Data

Sep. 10, 2018 (JP) .............................. JP2018-169036

(51) Int. Cl.
*B60C 11/24* (2006.01)
*G01M 17/02* (2006.01)

(52) U.S. Cl.
CPC .......... *B60C 11/246* (2013.01); *B60C 11/243* (2013.01); *G01M 17/02* (2013.01)

(58) Field of Classification Search
CPC ............ B60C 23/0435; B60C 23/0416; B60C 23/0489; B60C 23/0488; B60C 23/0415; B60C 23/0447; B60C 23/0494; B60C 23/062; B60C 23/0457; B60C 23/0459; B60C 23/0466; B60C 23/0471; B60C 23/0486; B60C 23/0408; B60C 23/20; B60C 23/0493; B60C 11/24; B60C 23/0401; B60C 23/0433; B60C 11/246;
(Continued)

(56) References Cited

U.S. PATENT DOCUMENTS 7,417,531 B2 * 8/2008 Obradovich .......... B60W 10/20
340/447
8,061,191 B2 * 11/2011 Hanatsuka ............ B60C 11/246
73/146

(Continued)

FOREIGN PATENT DOCUMENTS

JP H0353142 A 3/1991
JP 2007168671 A * 7/2007 ......... B60C 23/0483
(Continued)

*Primary Examiner* — Nimeshkumar D Patel
*Assistant Examiner* — Gedeon M Kidanu
(74) *Attorney, Agent, or Firm* — Harness, Dickey & Pierce, P.L.C.

(57) ABSTRACT

A tire system includes a tire side device that is arranged corresponding to a tire provided in a vehicle and transmits data related to the tire, and a wear estimation unit that estimates a tire wear state based on the data related to the tire. The tire side device holds data related to an elapsed time since the tire was manufactured as data related to the tire, transmits data related to the elapsed time to the wear estimation unit. The wear estimation unit estimates the tire wear state based on the mileage from the start of use of the tire and a tire deterioration degree indicated by the data related to the elapsed time.

8 Claims, 6 Drawing Sheets

(58) Field of Classification Search
CPC ... B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60G 2800/984; B60T 2240/06; B60T 2240/07; B60T 2240/08; E01F 9/696; F16D 2066/001; G01L 17/00; G01L 17/005; G01L 19/0092; G01L 19/08; G01L 19/083; G01L 19/086; G01L 5/28; G01L 7/166; G01B 11/22; G01B 2210/50; G01B 5/18; G01M 17/02; G01M 17/027; G01M 17/013; G02F 1/31; G02F 2203/12; H02S 10/12; H02S 20/21; H02S 20/22

See application file for complete search history.

(56) References Cited

U.S. PATENT DOCUMENTS

| | | | |
|---|---|---|---|
| 8,483,976 B2* | 7/2013 | Morinaga | B60C 23/064 702/34 |
| 9,649,896 B1* | 5/2017 | Lin | B60C 23/0486 |
| 2017/0113495 A1* | 4/2017 | Singh | B60C 11/246 |
| 2017/0161840 A1 | 6/2017 | Omata | |

FOREIGN PATENT DOCUMENTS

| | | | |
|---|---|---|---|
| JP | 2011168211 A | | 9/2011 |
| JP | 2011207398 A | * | 10/2011 |
| JP | 2016018477 A | | 2/2016 |

* cited by examiner

TIRE SYSTEM

CROSS REFERENCE TO RELATED APPLICATIONS

This application is a continuation application of International Patent Application No. PCT/JP2019/035355 filed on Sep. 9, 2019, which designated the U.S. and based on and claims the benefits of priority of Japanese patent application 2018-169036 filed on Sep. 10, 2018. The entire disclosure of all of the above application is incorporated herein by reference.

TECHNICAL FIELD

The present disclosure relates to a tire system that notifies a tire wear state through a portable device or the like based on tire information from a tire side device.

BACKGROUND

A method for predicting tire wear have been proposed.

SUMMARY

An object of the present disclosure is to provide a tire system capable of estimating a tire wear state with higher accuracy.

A tire system for estimating a tire wear state in one aspect of the present disclosure is arranged corresponding to a tire provided in a vehicle, and the tire system includes a tire side device for transmitting data on the tire and a wear estimation unit for estimating a tire wear state based on the data on the tire. The tire side device holds data on an elapsed time since the tire was manufactured as data on the tire, and transmits data on the elapsed time to the wear estimation unit. The wear estimation unit estimates the tire wear state based on a mileage from the start of use of the tire and a degree of tire deterioration indicated by the data on the elapsed time.

A reference numeral in parentheses attached to each component or the like indicates an example of correspondence between the component or the like and specific component or the like described in an embodiments below.

DETAILED DESCRIPTION

Figure 1:
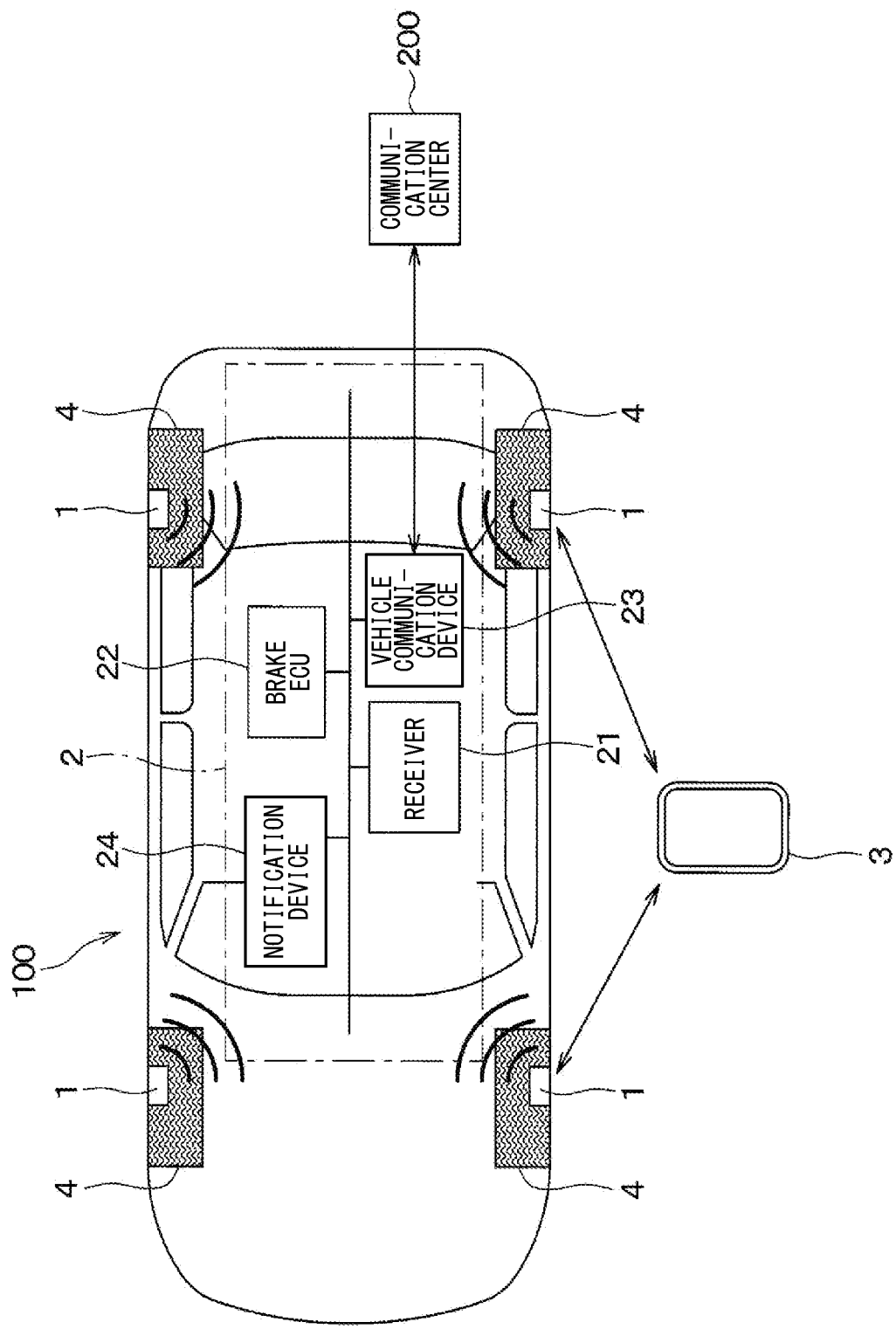
FIG. 1 is a schematic view showing a block configuration of a tire system according to a first embodiment.

In an assumable example, a method of predicting tire wear has been proposed. For example, since tire wear progresses according to a mileage of a vehicle, a technique for predicting tire wear based on the mileage is disclosed.

However, although tire wear progresses according to the mileage of the vehicle, the degree of tire wear varies depending on the type of tire, the type of vehicle, and the like. Therefore, it is necessary to take other requirements into consideration in addition to the mileage of the vehicle in order to more accurately estimate the tire wear state.

An object of the present disclosure is to provide a tire system capable of estimating a tire wear state with higher accuracy.

A tire system for estimating a tire wear state in one aspect of the present disclosure is arranged corresponding to a tire provided in a vehicle, and the tire system includes a tire side device for transmitting data on the tire and a wear estimation unit for estimating a tire wear state based on the data on the tire. The tire side device holds data on an elapsed time since the tire was manufactured as data on the tire, and transmits data on the elapsed time to the wear estimation unit. The wear estimation unit estimates the tire wear state based on a mileage from the start of use of the tire and a degree of tire deterioration indicated by the data on the elapsed time.

In this way, the tire wear state is estimated based on the degree of tire deterioration represented by the data on the elapsed time. Therefore, it is possible to estimate the tire wear state not only based on the mileage but also by taking into account the degree of tire deterioration. It is possible to estimate the tire wear state more accurately.

Hereinafter, embodiments of the present disclosure will be described with reference to the drawings. In the following embodiments, the same or equivalent parts are denoted by the same reference numerals.

First Embodiment

A tire system 100 having a tire wear state detecting function according to the present embodiment will be described with reference to FIGS. 1 to 8. The tire system 100 according to the present embodiment includes a tire side device 1, a vehicle body side system 2, and a portable device 3. Then, the tire system 100 transmits information on the elapsed time and mileage from the tire side device 1 to the portable device 3, estimates the tire wear state in the portable device 3, and notifies an user. Here, the tire system 100 performs a determination of the road surface condition, etc., in which the vehicle body side system 2 determines the road surface condition of the traveling road surface based on the data from the tire side device 1, and detects the tire wear state by using the tire side device 1 used for determining the road surface condition.

Figure 2:
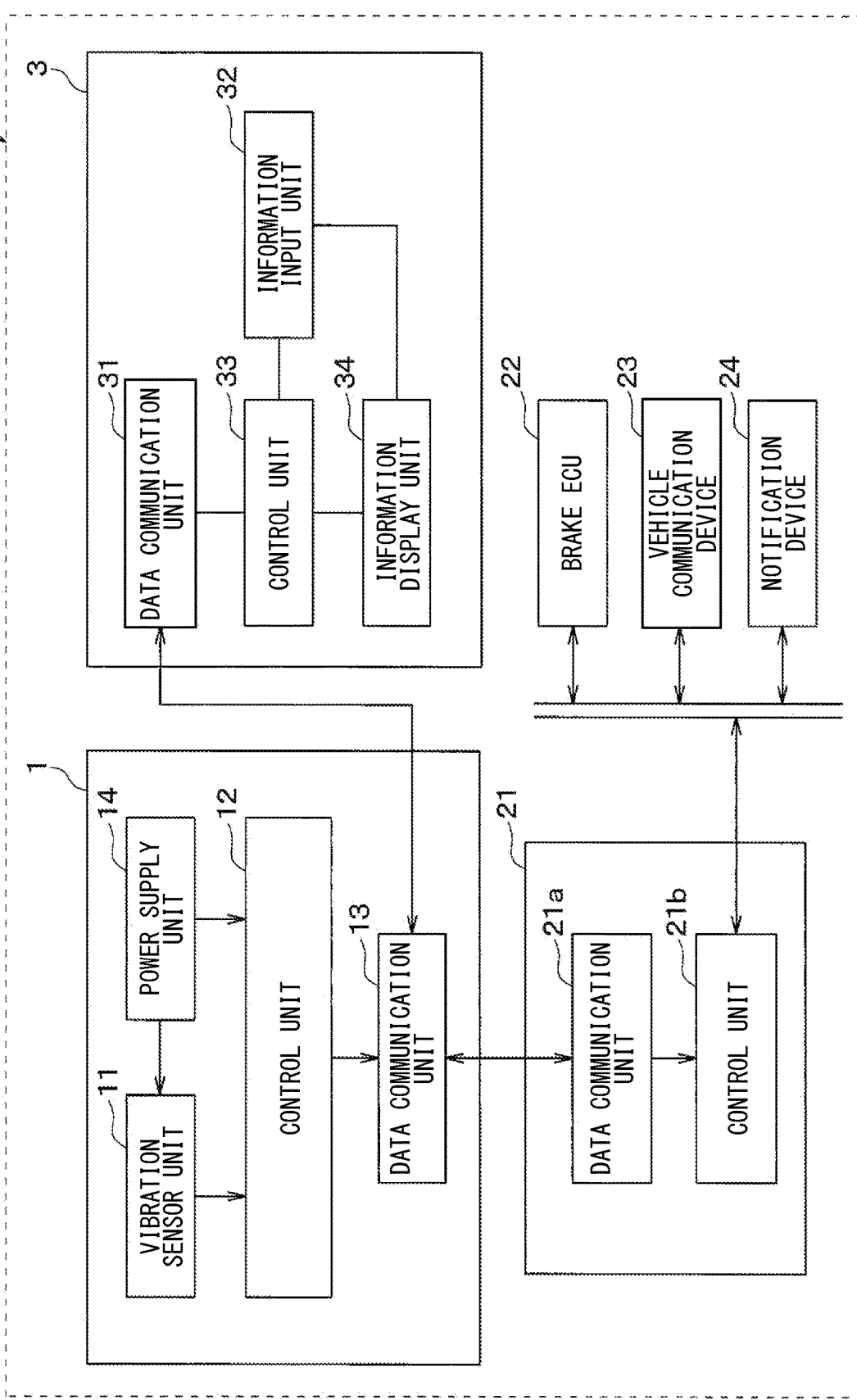
FIG. 2 is a block diagram showing a detailed configuration of a tire side device, a vehicle body side system, and a portable device.

As shown in FIGS. 1 and 2, the tire system 100 is configured to include the tire side device 1 provided on a wheel side, the vehicle body side system 2 including various parts provided on a vehicle body side, and the portable device 3 owned by the user. The vehicle body side system 2 includes a receiver 21, an electronic control device for brake control (hereinafter referred to as a brake ECU) 22, a vehicle communication device 23, a notification device 24, and the like. Hereinafter, details of each part constituting the tire side device 1, the vehicle body side system 2, and the portable device 3 will be described.

Figure 3:
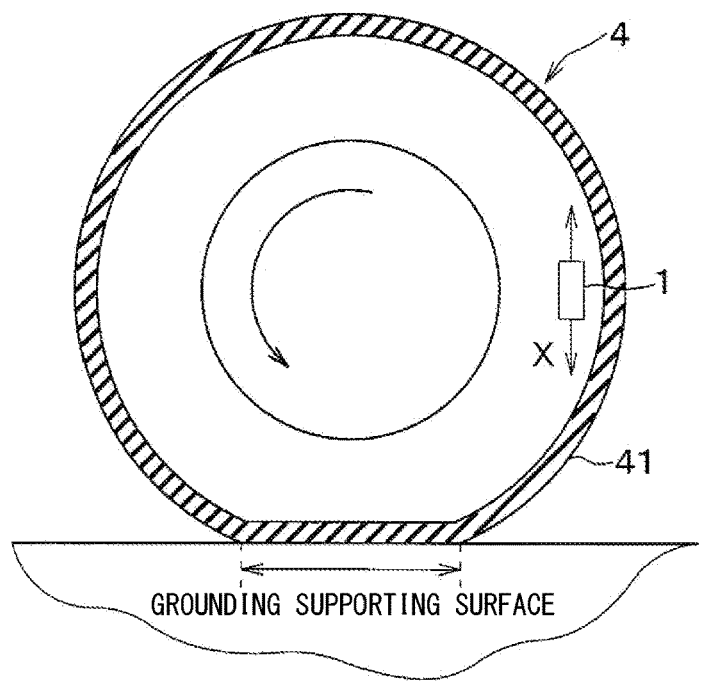
FIG. 3 is a schematic cross-sectional view of a tire to which a tire side device is attached.

First, the tire side device 1 will be described. As shown in FIG. 2, the tire side device 1 is configured to include a vibration sensor unit 11, a control unit 12, a data communication unit 13, and a power supply unit 14. For example, as shown in FIG. 3, the tire side device 1 is provided on a back surface side of a tread 41 of each tire 4.

The vibration sensor unit 11 constitutes a vibration detection unit for detecting a vibration applied to the tire 4, and serves also as a rotation detection unit that outputs a detection signal according to the rotation of the tire 4 used for calculating the mileage. For example, the vibration sensor unit 11 is configured by an acceleration sensor. In case that the vibration sensor unit 11 is the acceleration sensor, the vibration sensor unit 11 outputs a detection signal of acceleration as a detection signal, which corresponds to the vibration in a direction tangential to a circular trajectory drawn up by the tire side device 1 at the time of rotation of the tire 4, that is, a tire tangential direction indicated by an arrow X in FIG. 3. More specifically, the vibration sensor unit 10 generates as the detection signal an output voltage, which is positive in one direction and negative in the opposite direction, between two directions indicated with the arrow X. For example, the vibration sensor unit 10 performs acceleration detection at a predetermined sampling cycle set at a cycle shorter than a period of one rotation of the tire 4, and outputs a detection result as the detection signal. Although the detection signal of the vibration sensor unit 10 may be represented as an output voltage or an output current, the detection signal is exemplified to be an output voltage in the present embodiment as an example.

The control unit 12 is a part corresponding to a signal processing unit that creates data related to a detection target, is composed of a microcomputer equipped with a CPU, ROM, RAM, I/O, etc., and performs various types of processing according to a program stored in the ROM or the like. For example, the control unit 12 is configured to obtain a road surface data and mileage data by using and processing the detection signal of the vibration sensor unit 11 as a detection signal representing vibration data in the tire tangential direction, and transmit the road surface data to data communication unit 13.

Specifically, the control unit 12 is configured to extract a characteristic value of the tire vibration by using the detection signal output from the vibration sensor unit 11 as the detection signal representing the vibration data in the tangential direction of the tire and performing waveform processing of the vibration waveform indicated by the detection signal. In the present embodiment, the control unit 12 performs a signal processing on the detection signal of the acceleration of the tire 4 (hereinafter referred to as tire G), and extracts the characteristic value of the tire G. Further, the control unit 12 transmits the data including the extracted feature amount to the data communication unit 13 as road surface data which is data related to the road surface condition.

The characteristic value is a value which represents a feature of the vibration applied to the tire 4 as acquired by the vibration sensor unit 11 and, for example, expressed by a feature vector.

Figure 4:
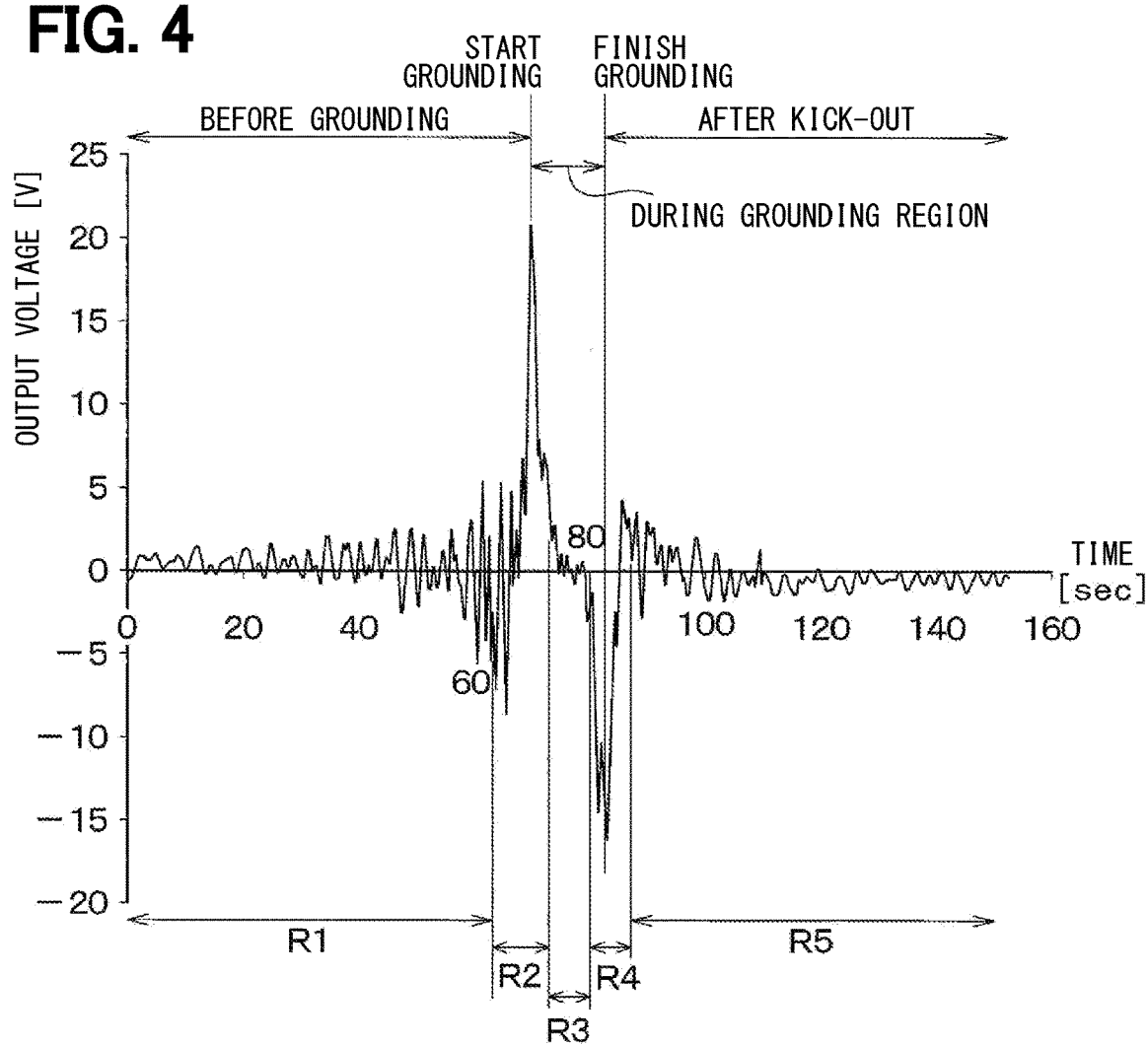
FIG. 4 is an output voltage waveform chart of a vibration sensor unit during rotation of the tire.

For example, an output voltage waveform of the detection signal of the vibration sensor unit 11 output during tire rotation changes as shown in FIG. 4. As shown in this figure, the output voltage of the vibration sensor unit 11 reaches a maximum value at a start of grounding when a portion of the tread 41 of the tire 4 corresponding to an arrangement location of the vibration sensor unit 11 begins to contact the ground as the tire 4 rotates. Hereinafter, a peak value at the start of contacting the ground at which the output voltage of the vibration sensor unit 11 takes the maximum value is referred to as a first peak value. Further, as shown in FIG. 4, the output voltage of the vibration sensor unit 11 has a minimum value at a contact end time when the portion of the tread 41 of the tire 4 corresponding to the arrangement location of the vibration sensor unit 11 is not grounded from the state where the portion of the tread 41 is grounded as the tire 4 rotates. Hereinafter, a peak value at the contact end time of the ground where the output voltage of the vibration sensor unit 11 has the minimum value is referred to as a second peak value.

The reason why the output voltage of the vibration sensor unit 11 takes the peak values at the above-described timings is as follows. When the portion of the tread 41 corresponding to the arrangement location of the vibration sensor unit 11 contacts the ground as the tire 4 rotates, a portion of the tire 4, which had a substantially cylindrical surface, is pressed to be deformed into a flat shape in the vicinity of the vibration sensor unit 11. Upon receiving an impact at this time, the output voltage of the vibration sensor unit 11 has the first peak value. When the portion of the tread 41 corresponding to the arrangement location of the vibration sensor unit 11 moves away from the ground contact surface as the tire 4 rotates, the tire is released from the pressing force in the vicinity of the vibration sensor unit 11, and the flat shape of the portion of the tire 4 returns to the substantially cylindrical shape. Upon receiving the impact when the shape of the tire 4 returns to the original shape, the output voltage of the vibration sensor unit 11 has the second peak value. As described above, the output voltage of the vibration sensor unit 11 takes the first peak value and the second peak value at the start of contacting ground and at the finish of contacting the ground, respectively. Since a direction of impact when the tire 4 is pressed and a direction of impact when the tire 4 is released from pressurization are opposite, polarities of the output voltages are also opposite.

Here, the moment at which the portion of the tire tread 41 corresponding to the arrangement location of the vibration sensor unit 11 contacts the road surface is referred to as a step-in region, and the moment at which the tire tread 41 leaves the road surface is referred to as a kick-out region. The "step-in region" includes a timing when the first peak value is reached, and the "kick-out region" includes a timing when the second peak value is reached. In addition, a region before the step-in region is referred to as a "pre-step-in region", a region from the step-in region to the kick-out region, that is, a region where the tire tread 41 corresponding to the location of the vibration sensor unit 11 is in contact with the ground, is referred to as a "pre-kick-out region", and a region after the kick-out region is referred to as a "post-kick-out region". In this manner, the period in which the portion of the tire tread 41 corresponding to the location of the vibration sensor unit 11 is in contact with the ground and before and after that portion can be divided into five regions. In FIG. 4, the pre-step-in region, the step-in region, the pre-kick-out region, the kick-out region and the post-kick-out region of the detection signal are indicated as five regions R1 to R5 in sequence, respectively.

The vibration generated in the tire 4 varies in each of the divided regions according to the road surface condition, and the detection signal of the vibration sensor unit 11 changes correspondingly. Therefore, by analyzing the frequency of the detection signal of the vibration sensor unit 11 in each region, the road surface condition of the vehicle on the road surface is detected. For example, in a slippy road surface condition such as a snow-covered road, the shearing force at the time of kicking out decreases, so that a band value selected from 1 kHz to 4 kHz band becomes small in the kick-out region R4 and the post-kick-out region R5. Since each frequency component of the detection signal of the vibration sensor unit 11 changes according to the road surface condition, it is possible to determine the road surface condition based on the frequency analysis of the detection signal.

Figure 5:
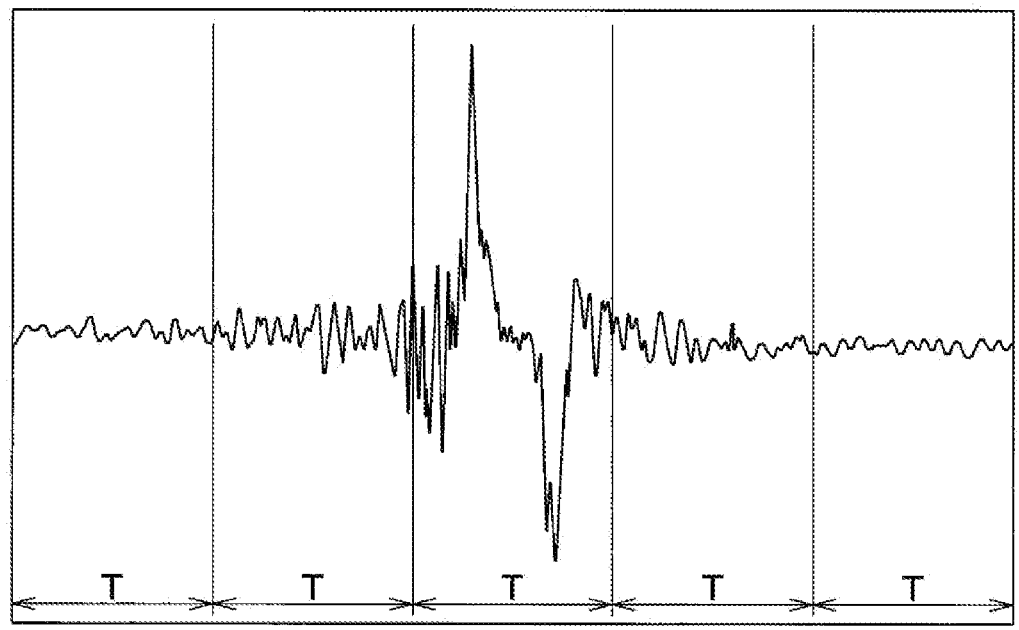
FIG. 5 is a chart which shows a detection signal of the vibration sensor unit in a manner divided into plural time zones each of which is a time window of a predetermined time width T.

The control unit 12 divides the detection signal of the vibration sensor unit 11 for one rotation of the tire 4 having a continuous time axis waveform into a plurality of sections each having a predetermined time width T as shown in FIG. 5, performs the frequency analysis in each section, and extracts the characteristic value. Specifically, by performing the frequency analysis in each section, the control unit 12 calculates a power spectrum value in each frequency band, that is, a vibration level in a specific frequency band, and this power spectrum value is used as the characteristic value.

Further, the control unit 12 is configured to constitute a distance acquisition unit that acquires data on the mileage from the start of use of the tire 4 by calculating the rotation speed of the tire 4 based on the time change of the detection signal of the vibration sensor unit 11. Specifically, the control unit 12 stores data on the number of revolutions of the tire 4 as data related to the mileage, or the mileage itself calculated by multiplying the number of revolutions by the length of one round of the tire 4 as data related to the mileage, and transmits the data to the data communication unit 13. By detecting that the tire 4 has made one rotation each time the detection signal of the vibration sensor unit 11 takes the first peak value of the second peak value, the number of revolutions of the tire 4 is obtained by calculating the number of rotations Further, the control unit 12 holds data regarding the elapsed time since the tire 4 was manufactured. For example, the control unit 12 is provided with a timer, and the timer measures the elapsed time and holds the data. Alternatively, the control unit 12 holds data regarding the manufacturing date of the tire side device 1, for example, the manufacturing date. Then, the control unit 12 can transmit the data of the elapsed time itself or the data related to the manufacturing date to the data communication unit 13 as the data related to the elapsed time.

The control unit 12 also controls data transmission from the data communication unit 13 and transmits the road surface data to the data communication unit 13 at the desired timing for data transmission so that the data communication unit 13 performs data communication.

For example, the control unit 12 extracts the characteristic value of the tire G each time the tire 4 makes one rotation, and transmits the road surface data to the data communication unit 13 once or a plurality of times each time the tire 4 makes one rotation or a plurality of rotations. For example, the control unit 12 transmits the road surface data including the feature amount of the tire G extracted during one rotation of the tire 4 to the data communication unit 13 when transmitting the road surface data to the data communication unit 13.

Further, as will be described later, the tire side device 1 can receive a request signal from the vehicle body side system 2 or the portable device 3 through the data communication unit 13. Based on this configuration, when the request signal is received, the control unit 12 transmits data on the mileage and data on the elapsed time to the data communication unit 13 as a response signal with respect to the request signal.

The data communication unit 13 is a part corresponding to a first data communication unit that performs two-way communication with the vehicle body side system 2 and the portable device 3. Various forms of bidirectional communication can be applied, such as Bluetooth communication including BLE (Bluetooth Low Energy) communication, wireless LAN (Local Area Network) such as wifi, Sub-GHz communication, ultra wideband Communication, ZigBee, etc. can be applied. "Bluetooth" is a registered trademark.

The data communication unit 13 transmits the data at the timing when various data such as road surface data are transmitted from the control unit 12, for example. The control unit 12 controls the timing of data transmission from the data communication unit 13. For example, in the case of road surface data, the data is transmitted from the data communication unit 13 each time the tire 4 is sent from the control unit 12 each time the tire 4 makes one or more rotations. Further, regarding the data related to the mileage and the data related to the elapsed time, the data is transmitted from the data communication unit 13 every time the data is sent from the control unit 12 in response to the request signal being sent.

The power supply unit 14 is provided as a power supply for the tire side device 1, and supplies electric power to each unit included in the tire side device 1 so that each unit can be operated. The power supply unit 14 is configured by a battery such as a button battery, for example. In addition to the battery, the power supply unit 14 may be configured by a power generator, a storage battery, and the like.

Subsequently, the vehicle body side system 2 will be described. As described above, the vehicle body side system 2 is provided with a receiver 21, a brake ECU 22, a vehicle communication device 23, a notification device 24, and the like.

The receiver 21 receives various data such as road surface data transmitted from the tire side device 1 and detects the road surface condition. Further, the data related to the mileage and the data related to the elapsed time may not be directly transmitted from the tire side device 1 to the portable device 3, but may be transmitted via the vehicle body side system 2 to the portable device 3 (hereinafter, referred to as an intermediary form). In that case, the receiver 21 also performs a process of outputting data related to the mileage and data related to the elapsed time to the vehicle communication device 23. Specifically, the receiver 21 is configured to include a data communication unit 21a and a control unit 21b.

The data communication unit 21a is a part constituting the second data communication unit, and plays a role of receiving various data transmitted from the data communication unit 13 of the tire side device 1 and transmitting the various data to the control unit 21b. Further, as will be described later, in a case of the intermediary form, when the request signal from the portable device 3 is transmitted to the control unit 21b through the vehicle communication device 23, the request signal is transmitted to the data communication unit 21a from the control unit 21b. Therefore, the data communication unit 21a also plays a role of transmitting the request signal to each tire side device 1.

The control unit 21b is configured by a computer including a CPU, a ROM, a RAM, an I/O and the like, and performs various processing according to a program stored in the ROM or the like.

Specifically, the control unit 21b stores and saves a support vector for each type of road surface, and detects the road surface condition based on the support vector and the feature amount included in the road surface data. The support vector is a characteristic value serving as a model, and is acquired, for example, by learning using a support vector machine. The support vector is acquired by experimentally driving a vehicle equipped with the tire-side device 1 on each type of road surface. During the experimental driving, the characteristic value extracted from the detection signal of the vibration sensor unit 11 is learned for a predetermined number of tire rotations, and extracting a predetermined number of typical characteristic values from the learned data. For example, the characteristic values are learned for one million rotations for each type of road surface, and a typical characteristic value for one hundred rotations is extracted from the learned values as the support vector. A similarity between the support vector and the characteristic value included in the road surface data is determined, and the type of the road to which the support vector having the high similarity belongs is defined as the road surface state on the traveling road surface of the vehicle. Since the method of calculating the feature amount and the degree of similarity is known, the description thereof is omitted here, but various known methods can be applied.

Further, in the case of the intermediary form, the control unit 21b performs a process of outputting data related to the mileage and data related to the elapsed time to the vehicle communication device 23, and is configured to transmit each data to the portable device 3 through the vehicle communication device 23.

Further, the control unit 21b transmits the detection result of the road surface condition to the notification device 24, and transmits the road surface condition to the driver from the notification device 24, if necessary. Thus, the driver tries to drive the vehicle in a manner matching the road surface condition and it is possible for driver to avoid potential danger to the vehicle. For example, the road surface condition may be displayed always by the notification device 24 or the road surface condition may be displayed to warn the driver only when the vehicle need be driven more carefully than usual, for example, when the road surface condition corresponds to the low μ road like the wet road or the frozen road.

The road surface condition is transmitted from the control unit 21b to an ECU such as the brake ECU 22, which performs vehicle motion control, so that the vehicle motion control is performed based on the transmitted road surface condition.

The brake ECU 22 is provided as a braking control device which performs various types of brake control. The brake ECU 22 drives an actuator for brake fluid pressure control to generate a brake fluid pressure automatically and pressurizes a wheel cylinder to generate a braking force. In addition, the brake ECU 22 independently controls the braking force of each road wheel.

As described above, the control unit 21b transmits the detection result of the road surface condition to the brake ECU 22. Based on the above configuration, the brake ECU 22 adjusts the braking force according to the road surface condition to perform brake control according to the road surface condition.

The vehicle communication device 23 is capable of communicating with a communication medium outside the vehicle. In the case of the present embodiment, the vehicle communication device 23 is used for communicating with the portable device 3.

The notification device 24 is composed of, for example, a meter display or the like, and is used to notify the driver that the road surface condition requires more careful driving. In case that the notification device 24 is configured with the meter display device, it is located at a position which the driver is capable of easy recognition during driving of the vehicle, for example, within an instrument panel in the vehicle. When the data indicating the road surface condition is transmitted from the receiver 21, the meter display can visually notify the driver by displaying the data in a manner in which the contents can be grasped. The notification device 24 can also be configured with a buzzer, a voice guidance device, or the like.

Subsequently, the portable device 3 will be described. The portable device 3 is a general-purpose communication device such as a mobile phone or tablet including a smartphone, and is used as a device different from a vehicle. The portable device 3 constitutes a wear state unit that estimates a tire wear state based on data related to mileage and data related to elapsed time. The portable device 3 is provided with a data communication unit 31, an information input unit 32, a control unit 33, an information display unit 34, and the like.

The data communication unit 31 plays a role of directly transmitting a request signal to the tire side device 1 or indirectly transmitting a request signal to the tire side device 1 through the vehicle body side system 2, and receiving data related to mileage and data related to elapsed time through the tire side device 1 or the vehicle body side system 2. In addition, the data communication unit 31 also plays a role of receiving data related to a life performance value according to the tire type and the like by communicating with the communication center 200.

The information input unit 32 is a part for inputting an instruction for the user to estimate the tire wear state, and it is also possible for the user to input various information. For example, when the portable device 3 is composed of a smartphone or a tablet, the information input unit 32 is composed of a touch panel type input mechanism, and in the case of a button push type mobile phone, it is composed of an input button or the like. In the present embodiment, the user inputs an instruction for estimating the tire wear state, data related to the tire type, and data related to the vehicle type through the information input unit 32.

The control unit 33 is configured by a computer including a CPU, a ROM, a RAM, an I/O and the like, and performs various processing according to a program stored in the ROM or the like. Specifically, the control unit 33 displays a menu screen displaying various menus including a tire wear state estimation menu through the information display unit 34, or when the tire wear state estimation menu is selected, the control unit 33 displays and processes accordingly.

For example, when the estimation menu regarding the tire wear state is selected, the control unit 33 displays a screen for inputting data related to the tire type and data related to the vehicle type, and allows the user to input the data related to the tire type and the vehicle type through the information input unit 32. Then, when the data related to the tire type and the vehicle type is input, the control unit 33 transmits the data related to the tire type and the vehicle type from the data communication unit 31 to the communication center 200. Further, in response to the above input, data related to the life performance value is transmitted from the communication center 200, so that the control unit 33 acquires the data related to the life performance value through the data communication unit 31, and prepares so that the tire wear state can be estimated using the data.

Here, the life performance value is an index indicating the difficulty of wear of the tire 4 associated with each tire type. Depending on the hardness of the rubber of the tire 4, the degree of scraping of the tire 4 due to traveling differs. Therefore, the life performance value is required for each tire type. The life performance value is determined for each tire type, but the way the load is applied changes depending on the vehicle type, and even if the tire type is the same, there may be a difference in the degree of scraping of the tire 4 due to traveling. Therefore, as a more preferable form, in the communication center 200, the life performance value for each tire type can be corrected based on the vehicle type, and the corrected life performance value can be transmitted as a data as a life performance value according to the tire type and the vehicle type.

Further, the control unit 33 performs a process of outputting a request signal through the data communication unit 31 when the tire wear state estimation menu is selected. When the request signal is output, the tire side device 1 returns data related to the mileage and data related to the elapsed time as a response signal, so that the control unit 33 receives the response signal through the data communication unit 31. Then, the control unit 33 estimates the tire wear state based on the data shown in the response signal and the data related to the life performance value acquired from the communication center 200, and transmits the estimation result to the information display unit 34.

The tire wear state is estimated by using a function formula or a map based on the mileage and elapsed time shown in the data related to the response signal and life performance value, and the life performance value. For example, when the function formula is used, a reference tire wear amount (hereinafter referred to as a reference wear amount) according to the mileage is calculated by multiplying the mileage by a predetermined coefficient. Then, the tire wear state can be estimated by making corrections that take into account the degree of tire deterioration estimated from elapsed time with respect to the reference wear amount and the life performance value. The degree of tire deterioration is set as a coefficient calculated by increasing the amount of tire wear as the degree of tire deterioration increases. For example, a correction that takes into account the degree of tire deterioration by multiplying the standard wear amount by a coefficient larger than 1. The tire deterioration degree has a relationship that increases as the elapsed time increases, and can be obtained as a value corresponding to the elapsed time by using a preset function formula or map. Further, assuming that the life performance value is represented by a value that is so high that the tire 4 is hard to be scraped, the higher the life performance value is, the smaller the tire wear amount is set as a coefficient calculated. For example, by multiplying the standard wear amount by a coefficient of less than 1, the correction can be made in consideration of the life performance value.

In addition, although the case of estimating the tire wear state using the function formula has been described here, the case of estimating the tire wear state using the map can be estimated in consideration of the tire deterioration degree and the life performance value. For example, a map in which the relationship of the tire wear amount according to the mileage is linked for each degree of tire deterioration may be prepared for each life performance value. In addition, using a map that links the relationship of tire wear amount according to the mileage for each tire deterioration degree, the tire wear amount including the tire deterioration degree is obtained, and a correction may be made by multiplying the tire wear amount by a coefficient corresponding to the life performance value. On the contrary, using a map that links the relationship of tire wear amount according to the mileage for each life performance value, the tire wear amount including the life performance value is obtained, and a correction may be made by multiplying the tire wear amount by a coefficient corresponding to the tire deterioration degree.

The information display unit 34 performs various displays based on instructions from the control unit 33, and is composed of display devices such as a liquid crystal display and an EL display. The information display unit 34 displays a menu screen and an estimation result of the tire wear state.

As described above, the tire system 100 according to the present embodiment is configured. Each unit forming the vehicle body side system 2 is connected through an in-vehicle LAN (Local Area Network) like CAN (Controller Area Network) communication. Each unit forming the vehicle body side system 2 is connected through an in-vehicle LAN (Local Area Network) like CAN (Controller Area Network) communication. Therefore, each part can communicate information with each other through the in-vehicle LAN.

On the other hand, the communication center 200 that communicates with the portable device 3 is a facility provided separately from the tire system 100, holds various data used for estimating the tire wear state, and plays a role of returning the corresponding data to corresponds to the portable device 3 in accordance with the request from the portable device 3. Specifically, the communication center 200 has a database that stores life performance values for each tire type. When the communication center 200 receives the data related to the tire type from the portable device 3, the communication center 200 takes in the data of the life performance value of the corresponding tire type from the database and returns the data to the portable device 3. Further, if the data related to the vehicle type is also delivered from the portable device 3, the communication center 200 can make a correction based on the vehicle type with respect to the captured life performance value. Therefore, data can be transmitted from the communication center 200 as a life performance value according to the tire type and the vehicle type.

Subsequently, the operation of the tire system 100 according to the present embodiment will be described in chronological order with reference to the flowcharts shown in FIGS. 6 to 8.

Figure 6:
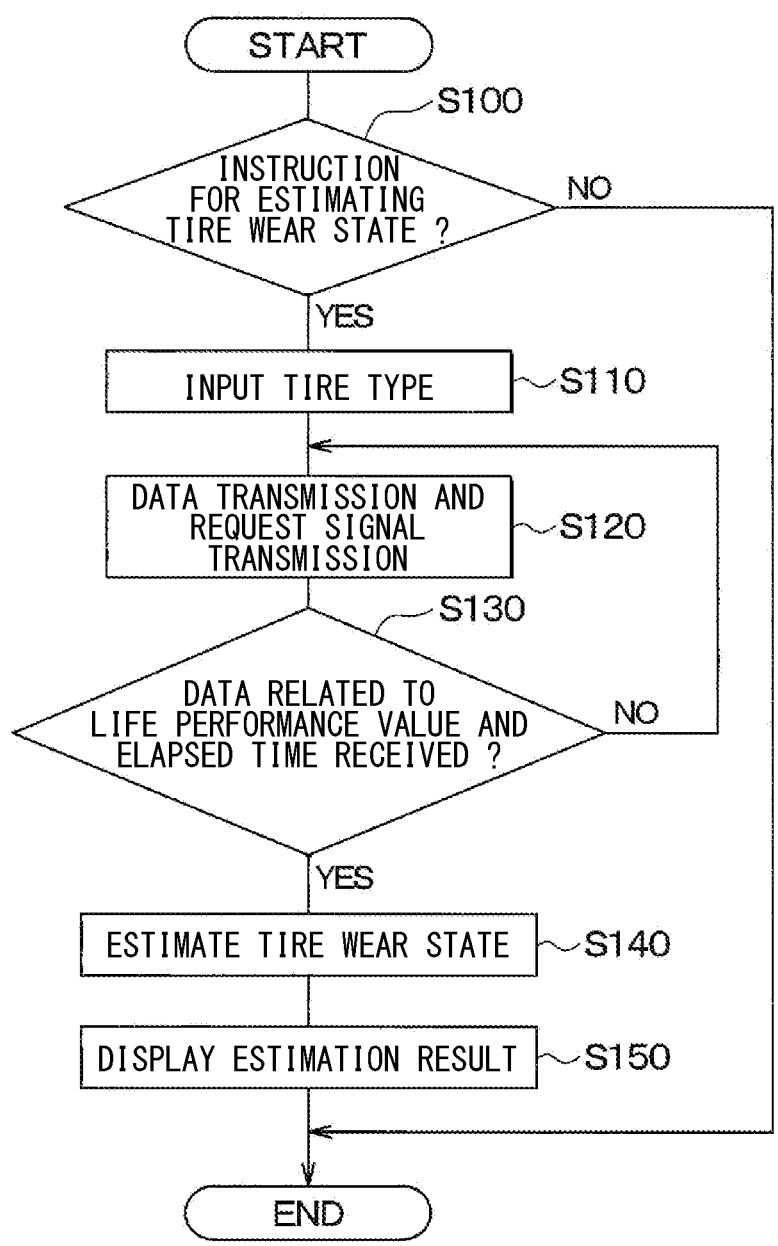
FIG. 6 is a flowchart of a tire wear state estimation process to be executed by a portable device.

FIG. 6 shows a tire wear state estimation process executed by the control unit 33 of the portable device 3. This process is executed by the control unit 33 at predetermined control cycles. FIG. 7 shows a tire response process executed by the control unit 12 of the tire side device 1. This process is executed by the control unit 12 at predetermined control cycles. Further, FIG. 8 shows a center response process executed by the communication center 200. This process is also executed by the communication center 200 at predetermined control cycles. The tire side device 1 also executes a process for determining the road surface condition, but since this process is known, only the estimation of the tire wear state will be described here.

First, in step S100 of FIG. 6, it is determined whether or not an instruction for estimating the tire wear state has been issued. For example, when the tire wear state estimation menu shown in the menu screen of the portable device 3 is selected, a positive determination is made in step S100. If an affirmative determination is made in step S100, the process proceeds to step S110, and if a negative determination is made, the process ends as it is.

In step S110, an input screen such as a tire type is displayed on the information display unit 34, and the user is made to input data related to the tire type and the vehicle type through the information input unit 32. Then, when the information input is completed, the process proceeds to step S120.

In step S120, the processing of data transmission and request signal transmission are performed. Specifically, the control unit 33 transmits data related to the tire type and the vehicle type to the communication center 200 through the data communication unit 31, and also transmits a request signal to the tire side device 1.

Figure 7:
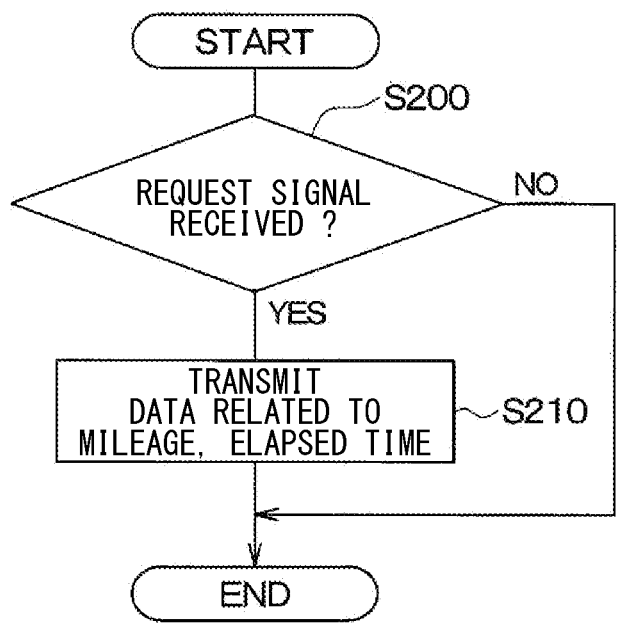
FIG. 7 is a flowchart of a tire response process to be executed by a control unit of a tire side device.
Figure 8:
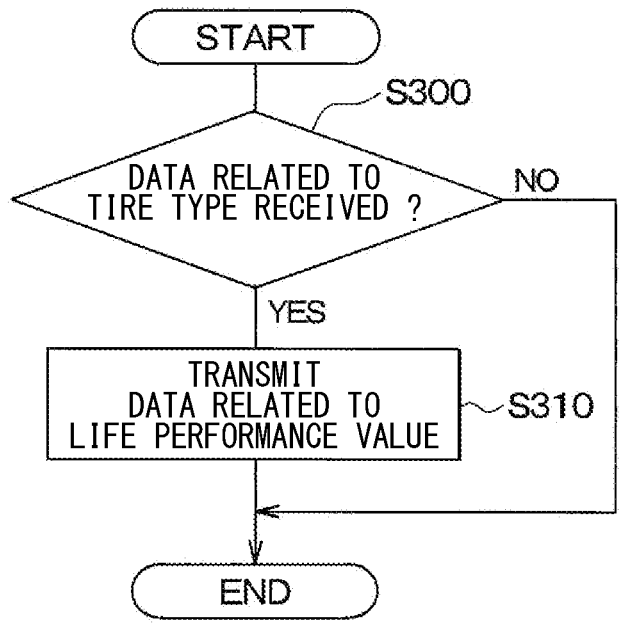
FIG. 8 is a flowchart of a center response process to be executed by a communication center.

On the other hand, in the tire side device 1, in step S200 of FIG. 7, it is determined whether or not the request signal has been received, and if it has been received, the process proceeds to step S210. Then, the data related to elapsed time and the data related to the mileage are transmitted to end the process. If a negative determination is made in step S200, the process ends as it is. Similarly, in step S300 of FIG. 8, the communication center 200 determines whether or not data related to the tire type and the vehicle type has been received, and if so, proceeds to step S310. Then, the data related to the life performance value corresponding to the tire type, more preferably the life performance value including the vehicle type in addition to the tire type is transmitted, and the process is terminated. If a negative determination is made in step S300, the process ends as it is. In this way, the tire response process shown in FIG. 7 and the center response process shown in FIG. 8 are completed.

Further, the process proceeds to step S130, and it is determined whether or not the portable device 3 has received the response from the communication center 200 corresponding to the data transmission in step S120 and the response from the tire side device 1 corresponding to the transmission of the request signal. Here, if data related to the life performance value is received from the communication center 200 and data related to the elapsed time, mileage, etc. are received from the tire side device 1, a positive determination is made in step S130. Then, if an affirmative determination is made in step S130, the process proceeds to step S140, and if a negative determination is made, the processes of steps S120 and S130 are repeated until an affirmative determination is made.

In step S140, the reference wear amount is calculated from the data related to the received mileage data, and based on the data related to the received life performance value and tire deterioration degree, as described above based the tire wear amount is calculated by multiplying the reference wear amount by a predetermined coefficient. Therefore, it is possible to estimate the tire wear state. For example, if the calculated tire wear amount exceeds a predetermined threshold value, it can be determined that it is time to replace the tire. Further, based on the calculated tire wear amount, it is possible to calculate a guideline for the mileage that can be achieved before changing the tire. Then, the process proceeds to step S150, and the estimation result of the tire wear state is displayed on the information display unit 34. For example, the message "The tires are worn, so please replace the tires" is displayed, or the message "You can drive 10,000 km until the tires are replaced" is displayed. In this way, the estimation result of the tire wear state can be displayed on the portable device 3, and the user can be notified.

As described above, in the tire system 100 of the present embodiment, the tire wear state is estimated by correcting the reference wear amount based on the tire deterioration degree represented by the data related to the elapsed time. Therefore, it is possible to estimate the tire wear state not only based on the mileage but also by taking into account the degree of tire deterioration. It is possible to estimate the tire wear state more accurately.

Further, in the present embodiment, since the tire wear state is estimated by taking into account the life performance value in addition to the degree of tire deterioration, it is possible to estimate the tire wear state by taking into account the difference in the degree of scraping of the tire 4 according to the tire type. Therefore, it is possible to estimate the tire wear state with higher accuracy.

Second Embodiment

A second embodiment will be described. The present embodiment is different from the first embodiment because the method of acquiring data regarding the elapsed time in the portable device 3 is changed from the first embodiment, and the other aspects are the same as those of the first embodiment. Therefore, only the different part from the first embodiment will be described.

In the first embodiment, the timer or the data regarding the stored manufacturing date provided in the control unit 12 is used as the data regarding the elapsed time. On the other hand, in the present embodiment, the user can input data regarding the elapsed time through the portable device 3.

Specifically, when the user selects the tire wear state estimation menu on the menu screen of the portable device 3, the user can input data related to the tire manufacturing date in addition to the tire type. For example, in step S110 of FIG. 6, data regarding the tire type and the manufacturing date of the tire are input. As the data regarding the manufacturing date of the tire, the manufacturing date itself may be input, or the manufacturing number, the product number, etc. corresponding to the manufacturing date may be input. In addition, the elapsed time can be calculated as the time from the manufacturing date to the current time. The current time may be input by the user, or may be used if the current time can be grasped by the portable device 3.

In this way, even if the user inputs data regarding the manufacturing date to the portable device 3, the same effect as that of the first embodiment can be obtained.

Third Embodiment

A third embodiment will be described. The present embodiment is different from the first embodiment because the tire side device 1 can acquire data on the elapsed time with respect to the first embodiment, and the other aspects are the same as those of the first embodiment. Therefore, only the part different from the first embodiment will be described.

In the first embodiment, the example in which the elapsed time can be measured by the timer provided in the control unit 12 is described, but in the present embodiment, the elapsed time can be acquired when the data related to the manufacturing date is only stored. Specifically, when the request signal is output from the portable device 3, the request signal includes the data of the current time, and the data is transmitted to the tire side device 1. In this way, the control unit 12 can calculate the elapsed time from the stored data on the manufacturing date and the current time data transmitted from the portable device 3. As a result, the tire side device 1 can transmit data related to the elapsed time to the portable device 3.

By transmitting the current time data from the portable device 3 to the tire side device 1 in this way, it is possible for the tire side device 1 to create data regarding the elapsed time. Even with such a structure, the same effect as in the first embodiment can be obtained.

Fourth Embodiment

A fourth embodiment will be described. The present embodiment is a modification of the first to third embodiments regarding the acquisition of data related to the mileage, and the other aspects are the same as that of the first embodiment. Therefore, only the parts different from the first embodiment are explained.

In the first embodiment, the tire side device 1 acquires data related to the mileage from the start of use of the tire 4 based on the detection signal of the vibration sensor unit 11, but in the present embodiment, the user is asked to input data related to the mileage into the portable device 3. For example, in step S110 of FIG. 6, data related to the tire type and the mileage are input. The mileage can be confirmed from the odometer of the vehicle or the like. When the tires are replaced after the vehicle is delivered, the mileage of the tires 4 after the replacement can be calculated by inputting the mileage of the vehicle into the portable device 3 at the time of tire replacement.

In this way, even if the user inputs data related to the mileage to the portable device 3, the same effect as that of the first embodiment can be obtained.

Fifth Embodiment

A fifth embodiment will be described. In the first to fourth embodiments, the vibration sensor unit 11 is used as the tire side device 1 to determine the road surface condition, whereas in the present embodiment, the sensor transmitter in the tire pressure monitoring system (hereinafter referred to as TPMS) is used. Since the other aspects are the same as those in the first to fourth embodiments, only the parts different from the first to fourth embodiments will be described.

In the first embodiment, since the tire side device 1 is configured to determine the road surface condition based on the detection signal of the vibration sensor unit 11, the data related to the mileage from the start of use of the tire 4 based on the detection signal of the vibration sensor unit 11. On the other hand, in a case that a TPMS sensor transmitter is used as the tire side device 1, when an acceleration sensor is provided, a rotation detection unit is configured by the acceleration sensor, and the data related to the mileage is obtained from the detection signal of the acceleration sensor. The TPMS sensor transmitter is generally provided with a pressure sensor and a temperature sensor, but an acceleration sensor can also be mounted for detecting the running of the vehicle. In that case, a change in a gravitational acceleration component appears in the detection signal of the acceleration sensor with the rotation of the tire 4, and the rotation speed of the tire 4 can be detected. Therefore, the mileage can be calculated by using the detection signal of the acceleration sensor as a detection signal according to the rotation of the tire 4.

Further, even when the tire side device 1 is composed of a TPMS sensor transmitter, since the control unit 12 is provided, data related to the elapsed time can be stored in the memory of the control unit 12 or the like. Therefore, even when the TPMS sensor transmitter is used as the tire side device 1, the same effect as that of the first embodiment can be obtained. Further, even when the data related to the elapsed time is not stored, the same effect as that of the second embodiment can be obtained by the user inputting the data regarding the manufacturing date into the portable device 3 as in the second embodiment. Further, if only the data of the manufacturing date is stored as the data related to the elapsed time, the data of the current time is transmitted from the portable device 3 to the tire side device 1 as in the third embodiment, and the same effect as that of the third embodiment can be obtained. Further, when the user inputs the mileage to the portable device 3 as in the fourth embodiment, the tire side device 1 may not be provided with the acceleration sensor.

When the tire side device 1 is used as a TPMS sensor transmitter, although it is arranged corresponding to each of the tires 4, it is generally attached to an air valve or the like instead of being directly attached to the tire 4. In this case, even if the tire is replaced, the tire side device 1 is used without replacement, so it is necessary to be able to reset the data related to the elapsed time and the mileage when the tire is replaced. That is, the above data is reset at the time of tire replacement so that the time from the tire replacement can be newly retained as data relating to the elapsed time. For example, the reset signal may be transmitted from the portable device 3 to the tire side device 1, or the reset trigger may be transmitted to the tire side device 1 by using a reset tester or the like.

Other Embodiments

Although the present disclosure has been described in accordance with the above-described embodiments, the present disclosure is not limited to the above-described embodiments, and encompasses various modifications and variations within the scope of equivalents. In addition, while the various combinations and configurations, which are preferred, other combinations and configurations, including more, less or only a single element, are also within the spirit and scope of the present disclosure.

For example, in each of the above embodiments, the degree of tire deterioration and the life performance value can be taken into consideration in estimating the tire wear state. However, if the tire wear state can be estimated by taking at least the degree of tire deterioration into consideration, more accurate estimation can be performed.

Further, in each of the above embodiments, the user is made to input data related to the tire type through the portable device 3, and the data is transmitted to the communication center 200. On the other hand, even if data related to the tire type is stored in the memory of the control unit 12 of the tire side device 1, the data related to the tire type is transmitted from the tire side device 1 to the portable device 3, and further transmitted to the communication center 200.

In particular, when the tire side device 1 is used for determining the road surface condition, since the tire side device 1 is directly attached to the tire 4, the data can be stored in association with the tire 4, and the tire type can also be stored. Further, in this case, it is possible to store the life performance value as the data associated with the tire 4, therefore, it is not necessary to input the tire type to the portable device 3 or to acquire the life performance corresponding to the tire type in the communication center 200. Further, even in this case, it may be desired to acquire the life performance value in consideration of the vehicle type. In that case, by inputting the data related to the vehicle type into the portable device 3 and transmitting the life performance value stored in the tire side device 1 with the data to the communication center 200, the life performance value including the vehicle type may be returned from the communication center 200.

However, when the data related to the tire type and the data of the life performance value are stored in the tire side device 1, the tire types to which the tire side device 1 can be attached are limited. Therefore, in consideration of versatility, it is preferable to enable input from the portable device 3.

Further, in each of the above embodiments, the portable device 3 is used as the wear estimation unit having the information input unit such as the tire wear state estimation instruction and the information display unit for displaying the estimation result, but it is not always necessary to use the portable device 3. The wear estimation unit may be composed of other device. That is, it is also possible to estimate the tire wear state by using an ECU provided in the vehicle, for example, an ECU in the navigation system (hereinafter referred to as a navigation ECU) as a wear estimation unit. That is, the tire wear state estimation menu can be displayed on the touch panel display of the navigation system, and the tire type can be input or the tire wear state estimation result can be displayed through the display. The communication between the navigation ECU and the communication center 200 may be performed through the vehicle communication device 23.

In the above embodiment, an acceleration sensor is used as the vibration sensor unit 11 which constitutes the vibration detection section. However, other elements that can detect vibration, for example, a piezoelectric element may be used as the vibration detection section.

In each of the embodiments described above, the tire side device 1 is provided in each of the plurality of tires 4. However, it is sufficient that the tire side device 1 is provided in at least one of the plurality of tires 4.

The control circuit and method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A tire system for estimating a tire wear state, comprising:
   a tire side device that is arranged corresponding to a tire provided in a vehicle and transmits data related to the tire; and
   a wear estimation unit configured to estimate a tire wear state based on the data related to the tire, wherein
   the tire side device holds data related to an elapsed time since the tire was manufactured as data related to the tire, and transmits the data related to the elapsed time to the wear estimation unit,
   the wear estimation unit estimates a tire wear state based on a mileage from the start of use of the tire and a tire deterioration degree indicated by the data related to the elapsed time, and
   the wear estimation unit includes
      an information input unit configured to input the data related to a tire type and a vehicle type, and
      a control unit configured to transmit the data related to the tire type to a communication center having a database that stores a life performance value that is an index on a wear difficulty of the tire corresponding to the tire type, to acquire a data related to the life performance value corresponding to the data related to the tire type and the vehicle type transmitted from the communication center, and to estimate the tire wear state based on the life performance value in addition to the mileage and the tire deterioration degree.

2. The tire system according to claim 1, wherein
the wear estimation unit estimates the tire wear state by correcting a reference wear amount, which is a reference value of the tire wear amount calculated based on the mileage, based on the tire deterioration degree.

3. The tire system according to claim 1, wherein
the tire side device includes a rotation detection unit configured to output a detection signal according to a rotation of the tire, and a control unit configured to be a distance acquisition unit that calculates the mileage based on the detection signal, and to control transmission of data related to the mileage in addition to data related to the elapsed time, and
the wear estimation unit estimates the tire wear state based on the data related to the mileage and the data related to the elapsed time.

4. The tire system according to claim 1, wherein
the wear estimation unit includes an information input unit configured to input data and a control unit configured to estimate the tire wear state using the data input from the information input unit,
the information input unit inputs data related to the mileage, and
the control unit estimates the tire wear state based on the data related to the mileage input from the information input unit and the tire deterioration degree indicated by the data related to the elapsed time transmitted from the tire side device.

5. The tire system according to claim 1, wherein
the tire side device is a sensor transmitter that detects a tire pressure in a tire pressure monitoring system and transmits data related to the tire pressure, and as the data related to the tire, while holding the data related to the elapsed time since the tire was manufactured, resets the elapsed time when the tire is replaced, and newly holds the time from a tire replacement as data related to the elapsed time.

6. A tire system for estimating a tire wear state, comprising:
   a tire side device that is arranged corresponding to the tire provided in a vehicle and transmits data related to the tire; and
   a wear estimation unit configured to estimate a tire wear state based on the data related to the tire, wherein
   the tire side device includes a rotation detection unit configured to output a detection signal according to the rotation of the tire, and a first control unit configured to be a distance acquisition unit that calculates a mileage based on the detection signal and to control transmission of the data on the mileage,
   the wear estimation unit includes an information input unit configured to input data and a second control unit configured to estimate the tire wear state using the data input from the information input unit,
   the information input unit inputs data related to the elapsed time since the tire was manufactured as data related to the tire, and estimates the tire wear state based on a tire deterioration degree by using the data related to the mileage and the data related to the elapsed time transmitted from the tire side device,
   the wear estimation unit
      inputs the data related to a tire type in the information input unit, transmits the data related to the tire type to the communication center having a database that stores a life performance value that is an index of the difficulty of tire wear of the tire corresponding to the tire type by the second control unit, acquires the data related to the life performance value corresponding to the tire type represented by the data related to the tire type transmitted from the communication center, and estimates the tire wear state based on the life performance value in addition to the mileage and the tire deterioration degree.

7. The tire system according to claim 1, wherein the wear estimation unit is a portable device provided separately from the vehicle and possessed by the user.

8. A tire system for estimating a tire wear state, comprising:

a tire side device that is arranged corresponding to a tire provided in a vehicle and transmits data related to the tire; and a wear estimation unit configured to estimate a tire wear state based on the data related to the tire, wherein the tire side device holds data related to an elapsed time since the tire was manufactured as data related to the tire, and transmits the data related to the elapsed time to the wear estimation unit, the wear estimation unit estimates a tire wear state based on a mileage from the start of use of the tire and a tire deterioration degree indicated by the data related to the elapsed time, the wear estimation unit includes an information input unit configured to input the data related to a tire type, and a control unit configured to transmit the data related to the tire type to a communication center having a database that stores a life performance value that is an index on a wear difficulty of the tire corresponding to the tire type, to acquire a data related to the life performance value corresponding to the tire type represented by the data related to the tire type transmitted from the communication center, and to estimate the tire wear state based on the life performance value in addition to the mileage and the tire deterioration degree, the control unit is configured to estimate the tire wear state using the data input from the information input unit, the information input unit inputs data related to the mileage, and the control unit estimates the tire wear state based on the data related to the mileage input from the information input unit and the tire deterioration degree indicated by the data related to the elapsed time transmitted from the tire side device.

* * * * *